Patented June 7, 1938

2,119,600

UNITED STATES PATENT OFFICE 2,119,600

TREATMENT OF RUBBER

Francis Norman Pickett, Westminster, London, England, assignor to United States Rubber Products, Inc., New York, N. Y., a corporation of Delaware No Drawing. Application January 4, 1935, Serial No. 425. In Great Britain January 11, 1934

1 Claim. (Cl. 18—50)

This invention relates to the treatment of crude and vulcanized rubber and has for its object to provide a solvent for crude rubber and to provide a process by means of which vulcanized rubber is rendered plastic so that it may be re-compounded, moulded and re-vulcanized, and in the case of vulcanized rubber to provide means for converting it into a solution, and then recovering the rubber in plastic form from the said solution.

In my co-pending application Serial No. 721,760, I have described processes and methods of use of a solvent or liquid or vapor consisting of or derived from, a distillate obtained by the destructive distillation of crude rubber or vulcanized rubber.

I have discovered that distillates of other organic substances possess somewhat similar properties to the distillate of rubber and in particular those derived from wood or coal distillation. I do not necessarily use the whole of the distillate derived from such sources, but preferably the creosotes, such for instance as are obtained by the fractional distillation of coal tar (itself a distillate), the distillation temperature of the fractions I use being limited to 270° C. maximum, or in the case of a wood distillate I prefer to use the ordinary commercial creosote which boils between 200° C. and 220° C.

My purpose is to select fractions of such distillates having boiling points that when vulcanized rubber is boiled in them, the temperature may be kept at such a point that the rubber is not damaged by heat.

As an example, I may use commercial creosote which is a well-known and pure product obtained by distillation of wood, usually beech wood. In this creosote I place vulcanized rubber, and heat in a "still" fitted with a reflux condenser. The vulcanized rubber rapidly swells and softens, and as boiling is continued the vulcanized rubber finally passes into solution, and the solution becomes clear.

The rubber continues in solution so long as the liquid remains hot, but on cooling, the rubber or a substantial part of it is precipitated or coagulated or otherwise separates out from the solution in the form of sheets or fragments. On pouring off the liquor which may be used again, I find the rubber to be in a plastic form, still somewhat swollen and containing some of the creosote. By degreasing or kneading the rubber so obtained, either with or without alcohol, I obtain a soft plastic rubber that can be re-compounded, moulded and vulcanized. Unlike the rubber distillate described in my co-pending applications, an excess of this creosote appears to prevent or retard the re-vulcanization, although a small percentage of it does not prevent revulcanization, but appears to act in the same manner as well known softeners.

For treating waste rubber such as tire rubber, I preferably reduce the rubber to crumb form and then add creosote say in the proportion of 1 gallon to 100 lbs. of rubber and intimately mix the two preferably on a mill of the friction type. I then place the mixture in a steam chamber, and either heat by means of a steam jacket or admit live steam into the interior of the chamber. I have found that after one or two hours or longer with a steam pressure preferably of 60 lbs. per sq. inch, the rubber has become plastic and on putting it upon a mill or mixer, I am able to make it into sheets and cause it to behave like a plastic compounded crude rubber. The excess of creosote (if any) contained in the rubber is squeezed out at the sides of the rolls, or may be extracted with alcohol, and on adding vulcanizing and compounding materials, I can mould and re-vulcanize the rubber in any convenient well known manner.

I have also succeeded in re-vulcanizing the precipitated rubber without the addition of any other materials, but the resulting vulcanizate was much softer than the original rubber.

Subjecting the vulcanized rubber to the vapor of the creosote when it boils also renders it plastic or devulcanized.

When the vulcanized rubber is treated so that it goes into solution form, I find that the compounding materials such as zinc oxide and indeed all such materials as are insoluble in creosote tend to separate out and may be collected and cleaned.

I have utilized creosote for separating the cotton contained in a tire from the rubber by boiling with creosote and allowing the rubber to go into solution and then withdrawing the cotton from the vessel in which the two have been treated.

In using the term "solution" I use it in the sense that it is used in the rubber industry, and adopt the definition of G. Martin in his book "Industrial and Manufacturing Chemistry" who writes of Crude Rubber:—"Strictly speaking rubber is insoluble in all ordinary solvents. It swells up however when mixed with benzol, etc."—and forms what may be termed "colloidal solutions" as distinguished from true solution—the rubber having a sponge or foam-like structure, and the solvent diffusing in by osmose between the walls distends the rubber network into what we call a "solution".

A further valuable feature of my invention is in the preparation of dispersions of rubber in an aqueous liquid whereby rubber (crude or vulcanized) is dissolved in hot solvents of the type described, and while still hot are dispersed by the aid of an ammoniacal soap or any other known similar agent. The dispersion is complete as long as the solution is kept hot, but breaks down on cooling, (see British Patent No. 206,520, T. Whittelsey). Dipping cold articles or formers into such hot dispersions will produce a coating of rubber on the said formers. The dispersion may have vulcanizing and compounding materials included and the rubber may be prevulcanized before deposit or may be vulcanized after deposit.

Another feature of the invention is the manufacture of rubber strips, tubes, rods and the like by forcing a hot solution of rubber obtained as described through a cold orifice or nozzle or into a cold bath, preferably but not necessarily, of alcohol. The "solution" may be complete or in any stage of "swelling" (as described above).

It will be obvious without further description that this invention where rubber is kept in solution while hot and coagulated or precipitated when cooled, can be used for a variety of purposes such as the manufacture of sponge rubber, rubber roadways, impregnation of cords and fabrics and the like and indeed to practically any process to which latex or rubber solutions can be applied.

Solutions made in accordance with my invention may be added to hot latex, and the rubber coagulated or precipitated on cooling. A solvent liquid of the type described added to latex, while both are hot, profoundly modifies the latex so that the rubber in the mixture separates out on cooling and this property may be utilized for numerous purposes as mentioned above.

It should be understood that the solution and precipitation of the rubber is reversible, that is to say, if a solution is prepared in the manner described and the rubber precipitated, then the rubber goes into solution again should the solvent and the rubber be re-heated.

With the detailed description given above, it will be obvious that modifications will suggest themselves without departing from the principle of the invention, and it is not desired to limit the invention otherwise than as set forth in the appended claim.

Having thus described my invention, what I claim and desire to protect by Letters Patent is:

A process of preparing an artificial rubber dispersion for use in dipping operations, which comprises dispersing in an aqueous liquid with the aid of a dispersing agent at an elevated temperature rubber softened with a creosote having a boiling range at atmospheric pressure not exceeding approximately 270° C.

FRANCIS NORMAN PICKETT.